United States Patent
Dong (10) Patent No.: US 10,313,644 B2
(45) Date of Patent: Jun. 4, 2019

(54) FLUORESCENSE WHEEL, PROJECTION LIGHT SOURCE, PROJECTOR AND ITS CONTROL METHOD

(71) Applicants: BOE TECHNOLOGY GROUP CO., LTD., Beijing (CN); HEFEI XINSHENG OPTOELECTRONICS TECHNOLOGY CO., LTD, Anhui (CN)

(72) Inventor: Hui Dong, Beijing (CN)

(73) Assignees: BOE TECHNOLOGY GROUP CO., LTD., Beijing (CN); HEFEI XINSHENG OPTOELECTRONICS TECHNOLOGY CO., LTD., Anhui (CN)

( * ) Notice: Subject to any disclaimer, the term of this patent is extended or adjusted under 35 U.S.C. 154(b) by 60 days.

(21) Appl. No.: 15/677,179

(22) Filed: Aug. 15, 2017

(65) Prior Publication Data

US 2018/0077393 A1    Mar. 15, 2018

(30) Foreign Application Priority Data

Sep. 13, 2016    (CN) .......................... 2016 1 0821258

(51) Int. Cl.
| | |
|---|---|
| *H04N 9/31* | (2006.01) |
| *G03B 21/00* | (2006.01) |
| *G02B 21/20* | (2006.01) |
| *G03B 21/20* | (2006.01) |

(52) U.S. Cl.
CPC ......... *H04N 9/3111* (2013.01); *G03B 21/204* (2013.01); *H04N 9/317* (2013.01); *H04N 9/3158* (2013.01); *H04N 9/3182* (2013.01); *G03B 21/006* (2013.01); *G03B 21/008* (2013.01); *G03B 21/2066* (2013.01); *H04N 9/3164* (2013.01); *H04N 9/3167* (2013.01)

(58) Field of Classification Search
CPC ...... H04B 9/3111; H04B 9/317; G03B 21/204
USPC ......................................................... 362/260
See application file for complete search history.

(56) References Cited

U.S. PATENT DOCUMENTS 7,212,359 B2 *    5/2007    Richards .............. G02B 26/008
                                                                    348/743
8,884,554 B2 *    11/2014    Bennette ................ H05B 37/02
                                                                    315/294

(Continued)

FOREIGN PATENT DOCUMENTS

CN    2621303 Y    6/2004
CN    1515120 A    7/2004

(Continued)

OTHER PUBLICATIONS

First Office Action for Chinese Patent Application No. 201610821258.7 dated Nov. 24, 2017.

*Primary Examiner* — Bryon T Gyllstrom
(74) *Attorney, Agent, or Firm* — Calfee, Halter & Griswold LLP (57) ABSTRACT

An embodiments of the present disclosure relate to a fluorescence wheel, a projection light source, a projector and its control method. The fluorescent wheel includes a substrate having a reflecting surface; and a fluorescent layer disposed on the reflecting surface of the substrate. The fluorescent layer includes a high color gamut region and a low color gamut region.

16 Claims, 6 Drawing Sheets

(56) References Cited

U.S. PATENT DOCUMENTS

| | | | | |
|---|---|---|---|---|
| 2007/0146509 A1* | 6/2007 | Hekstra | ................ | G09G 3/3413 348/253 |
| 2008/0158514 A1* | 7/2008 | Penn | ..................... | G03B 21/20 353/31 |
| 2008/0310168 A1* | 12/2008 | Huang | ................... | G02B 26/04 362/297 |
| 2012/0320103 A1* | 12/2012 | Jesme | ................. | G09G 3/3413 345/690 |
| 2013/0314896 A1* | 11/2013 | Finsterbusch | ........ | G03B 21/204 362/84 |
| 2014/0204558 A1* | 7/2014 | Bartlett | ................ | G02B 26/008 362/84 |
| 2014/0285772 A1* | 9/2014 | Tajiri | ................... | G02B 27/141 353/31 |
| 2014/0293576 A1* | 10/2014 | Chou | .................. | G03B 21/204 362/84 |
| 2015/0049456 A1* | 2/2015 | Hoehmann | .......... | H04N 9/3158 362/84 |
| 2017/0048502 A1* | 2/2017 | Guo | ........................ | F21V 9/40 |
| 2017/0068089 A1* | 3/2017 | Mehl | .................... | G03B 21/204 |

FOREIGN PATENT DOCUMENTS

| | | |
|---|---|---|
| CN | 1978221 A | 6/2007 |
| CN | 101372616 A | 2/2009 |
| CN | 104216212 A | 12/2014 |
| CN | 204028554 U | 12/2014 |
| CN | 104769497 A | 7/2015 |
| CN | 104776349 A | 7/2015 |
| CN | 105045025 A | 11/2015 |
| CN | 105353581 A | 2/2016 |
| CN | 105700281 A | 6/2016 |
| CN | 205539893 U | 8/2016 |
| CN | 206096738 U | 4/2017 |
| JP | 2015049441 A | 3/2015 |

* cited by examiner

FLUORESCENSE WHEEL, PROJECTION LIGHT SOURCE, PROJECTOR AND ITS CONTROL METHOD

CROSS-REFERENCE TO RELATED APPLICATIONS

The application claims the priority to and the benefit of Chinese Patent Application No. 201610821258.7, filed on Sep. 13, 2016 and entitled "fluorescence wheel, projection light source, projector and its control method", which is incorporated herein by reference in its entirety.

TECHNICAL FIELD

The present disclosure relates to display technology field, and more particularly, to a fluorescence wheel, a projection light source, a projector and its control method.

BACKGROUND

In a projector, fluorescent wheel is widely used, by which the light projected on the fluorescent wheel is excited to give out a desired colored light sequence.

In the related art, there is a contradiction between the color gamut and the luminance, for example, when the color gamut is high, the luminous efficiency is low, and when the color gamut is low, the luminous efficiency is high, this is an inherent problem in the art. When the projector is in use, If the color gamut meets the user's requirement, the brightness cannot meet the user's requirement; if the brightness meets the user's requirement, the color gamut cannot meet the user's requirement.

SUMMARY

The embodiments of the present disclosure provide the following technical solution, so as to achieve an effect of the present disclosure.

In one aspect, the present disclosure provides a fluorescent wheel including a substrate having a reflecting surface; and a fluorescent layer disposed on the reflecting surface of the substrate. Wherein the fluorescent layer includes a high color gamut region and a low color gamut region.

In another aspect, the present disclosure provides a projection light source including the fluorescent wheel according to present disclosure, a first sub-light source and a second sub-light source disposed opposite to each other and located towards to the reflecting surface of the fluorescent wheel; and a first dichroic mirror disposed between the first sub-light source and the second sub-light source. wherein the first color lights emitted from both of the first sub-light source and the second sub-light source is projected on the first dichroic mirror, and the central axis of the first color light emitted from the first sub-light source coincides with that of the first color light emitted from the second sub-light source. wherein the first color light emitted from the first sub-light source is reflected by first dichroic mirror and projected away from the fluorescent wheel; the second color light emitted from the second sub-light source is reflected by the first dichroic mirror and projected on the fluorescent layer of the fluorescent wheel, the fluorescent layer is excited by the first color light to give out a second color light, which transmits through the first dichroic mirror; the axis of the second color light through the first dichroic mirror and the axis of the first color lights reflected by the first dichroic mirror have a common central axis, and give out a white light when mixed together.

In another aspect, the present disclosure provides a projector including a projection light source according to present disclosure.

In another aspect, the present disclosure provides a method for controlling the projector according to the claim 12, comprising following steps:

during the first frame, controlling the fluorescent wheel to rotate so that the light emitted from the first sub-light source or the second sub-light source of the projection light source is projected on the high color gamut region of the fluorescent wheel, and controlling sub-pixels in a first area of the display element to display;

during the second frame, controlling the fluorescent wheel to rotate so that the light emitted from the first sub-light source or the second sub-light source of the projection light source is projected on the low color gamut region of the fluorescent wheel, and controlling sub-pixels in a second area of the display element to display;

combining the first frame and the second frame into one picture.

BRIEF DESCRIPTION OF THE DRAWINGS

In order to more clearly illustrate the technical solutions in embodiments of the present disclosure or in related art, drawings to be used in the descriptions of the embodiments or the related art will be briefly introduced below. Apparently, the drawings in the following description are only for some embodiments of the present disclosure, and other drawings may be obtained based on these drawings by those skilled in the art without paying creative effort.

wherein: 01. first color light; 02. second color light; 03. third color light; 04. fourth color light; 10. fluorescent wheel; 11. substrate; 12. fluorescent layer; 13. high color gamut region; 14. low color gamut region; 15. shaft; 16. motor; 20. first sub-light source; 21. second sub-light source; 22. optical element; 31. first dichroic mirror; 32. second dichroic mirror; 33. third dichroic mirror; 40. first polarizing device; 41. Polarized-light converter; 42. polarizing plate; 43. polarizing beam combiner; 44. second polarizing device; 50. display element; 51. LCD chip; 52. LCOS chip; 53. DMD chip; 60. combining mirror; 70. reflecting mirror; 80. projection lens.

DETAILED DESCRIPTION

The technical solutions in embodiments of the present disclosure will now be described in conjunction with the accompanying drawings in embodiments of the present disclosure, and it will be apparent that the described embodiments are merely part of the embodiments of the present disclosure and not all of the embodiments. According to embodiments of the present disclosure, all other embodiments obtained by those skilled in the art without making creative work are within the scope of the present disclosure.

Figure 1:
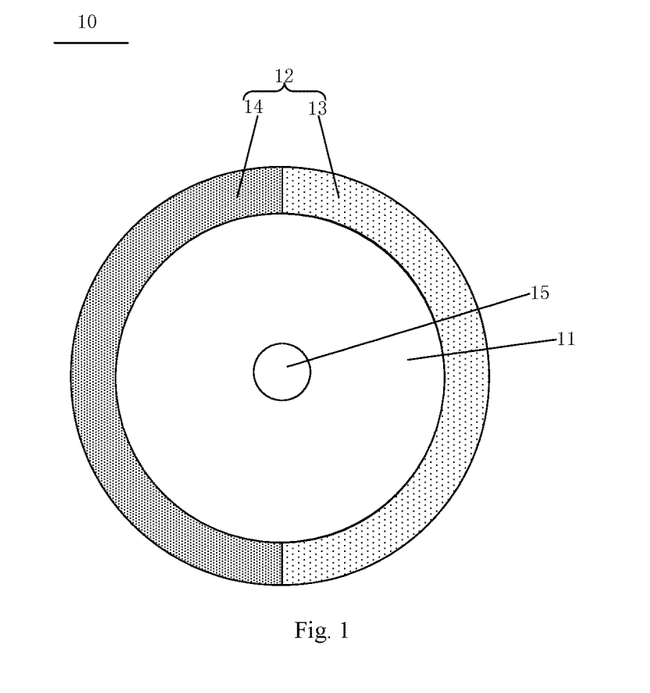
FIG. 1 is a structural schematic diagram of the fluorescent wheel according to the first embodiment of the present disclosure.
Figure 2:
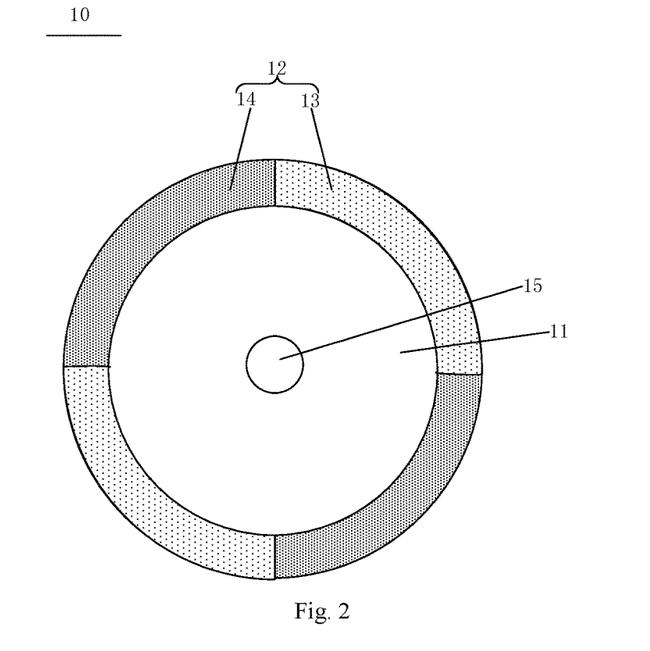
FIG. 2 is a structural schematic diagram of the fluorescent wheel according to the second embodiment of the present disclosure.

A fluorescent wheel 10 according to an exemplary embodiment of present disclosure, as shown in FIGS. 1 and 2, includes a substrate 11 having a reflecting surface, and a fluorescent layer 12 provided on the reflecting surface of the substrate 11. The fluorescent layer 12 includes at least one high color gamut region 13 and at least one low color gamut region 14.

Wherein, as shown in FIGS. 1 and 2, the fluorescent wheel 10 further includes a shaft 15 which rotates the body of the fluorescent wheel. As shown in FIGS. 1 and 2, the shaft 15 is located at the center of the fluorescent wheel 10. It is to be clearly understood that this is done by way of illustration and example only, and the position of the shaft 15 is not limited.

The following matters need to be noted:

The first, the shape and material of the substrate 11 are not limited, the shape of the substrate 11 in FIGS. 1 and 2 is only for illustrative purposes.

In addition, the reflecting surface 12 of the substrate 11 is not limited, as long as the light excited by the fluorescent layer 12 can be reflected out. For example, all of the side surfaces of the substrate 11 on which the fluorescent layer 12 is provided has a reflection function, or a part of the surface on which fluorescent layer 12 is provided has a reflection function.

The second, the shape of the fluorescent layer 12 is not limited, the shape of the fluorescent layer 12 in FIGS. 1 and 2 is only for illustrative purposes.

In addition, the material of the fluorescent layer 12 is not limited, as long as the fluorescence can be excited out by the incident light.

Figure 3:
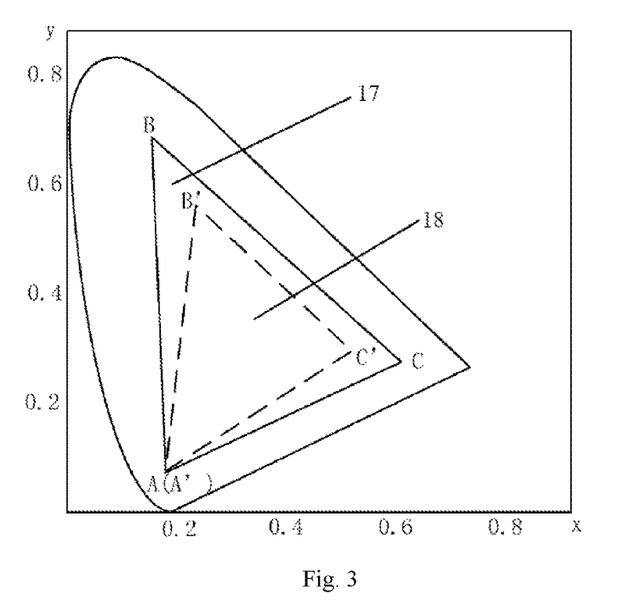
FIG. 3 is a 1931 CIE (Commission Internationaldel Eclairage) chromaticity diagram.

The third, the high color gamut region 13 of the fluorescent layer 12 means that the material set on the high color gamut region 13 is excited by light to give out fluorescence, the fluorescence is located within the first region 17 in FIG. 3, the picture formed by the light in the first region 17 has a higher color gamut and a lower brightness.

Accordingly, the low color gamut region 14 of the fluorescent layer 12 means that the material set on the high color gamut region 13 is excited by light to give out fluorescence, the fluorescence is located within the second region 18 in FIG. 3, the picture formed by the light in the second region 18 has a lower color gamut and a higher brightness.

Wherein, FIG. 3 is a 1931 CIE (Commission Internationaldel Eclairage) chromaticity diagram. The second region 18 is a low chromaticity region surrounded by three points A', B' and C', and the first region 17 is a high chromaticity region surrounded by A, B, and C, which does not contain the second region 18 region. Wherein A', B' and C' are three primary colors in the low chromaticity region, and A, B, and C are three primary colors in the high chromaticity region.

The fourth, the number of the high color gamut region 13 and the low color gamut region 14 are not limited, for example, as shown in FIG. 1, there is only one high color gamut region 13 and one low color gamut region 14, and as shown in FIG. 2, there are multiple high color gamut regions 13 and multiple low color gamut regions 14.

The fluorescent wheel 10 is provided according to an embodiment of the present disclosure. By dividing the fluorescent layer 12 of the fluorescent wheel 10 into a high color gamut region 13 and a low color gamut region 14, the fluorescent wheel 10 may be excited and give out a light with high color gamut and low brightness, or a light with low color gamut and high brightness light. Thus, when the fluorescent wheel 10 is applied to a projector, one picture is displayed by two frames, in the first frame, the high gamut sub-pixels is turned on and the low gamut sub-pixels is turned off, in the second frame, the high gamut sub-pixels is turned off and the low-gamut sub-pixels is turned on, so that the picture watched by user contains both the high-color gamut portion and the low-color gamut portion, thereby the display effect is improved. In addition, when the first frame and the second frame are combined into one picture, the luminance may have a certain degree homogenization, so that the contradiction between the color gamut and the brightness may be improved.

Figure 4:
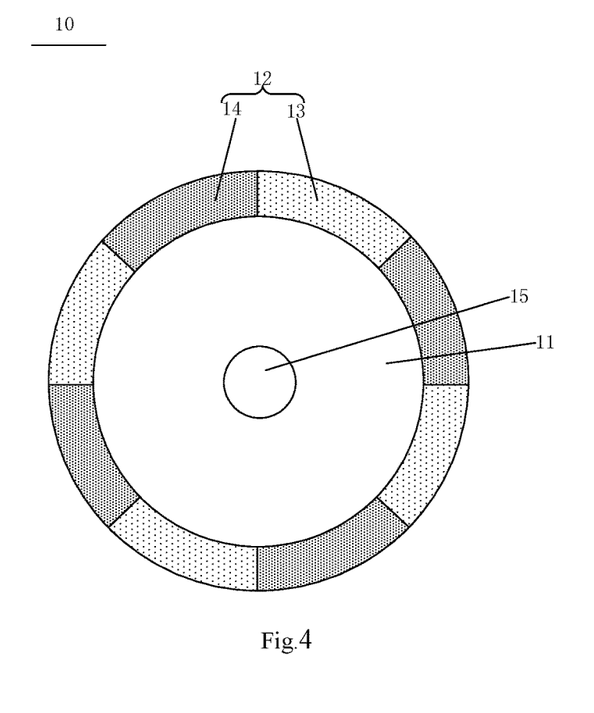
FIG. 4 is a structural schematic diagram of the fluorescent wheel according to the third embodiment of the present disclosure.

For example, as shown in FIG. 4, the number of the high color gamut region 13 is the same as that of the low color gamut region 14, and the high color gamut region 13 and the low color gamut region 14 are disposed alternately.

In the embodiment of present disclosure, the plurality of high color gamut regions 13 and the plurality of the low color gamut region 14 are disposed alternately. When the fluorescent wheel 10 is used in the projector, the fluorescent wheel 10 revolves one turn, the projector may display a plurality of pictures, thereby the picture refresh frequency is improved.

In order to reduce production costs, in the embodiment of the present disclosure, for example, as shown in FIGS. 1, 2 and 4, the fluorescent layer 12 is disposed near the edge of the substrate 11 and presented in a circle.

Wherein, one skilled in the art should appreciate that during the rotation of the wheel 10, the fluorescent layer 12 need to continue to excite out the fluorescence, therefore the central axis of the fluorescent layer 12 coincides with that of the fluorescent wheel 10.

Based on the above, in order to get the material of the fluorescent layer 12 easier, in an embodiment of the present disclosure, for example, the material of the high color gamut region 13 and the low color gamut region 14 of the fluorescent layer 12 are selected from the group of consisting of silicate, chlorosilicate, aluminate, nitrogen oxides, nitrides, tungstates, molybdates, sulfur oxides, and quantum dots.

Wherein, the material of the high color gamut region 13 and the low color gamut region 14 may be the same or a part of them may be the same.

Figure 5A:
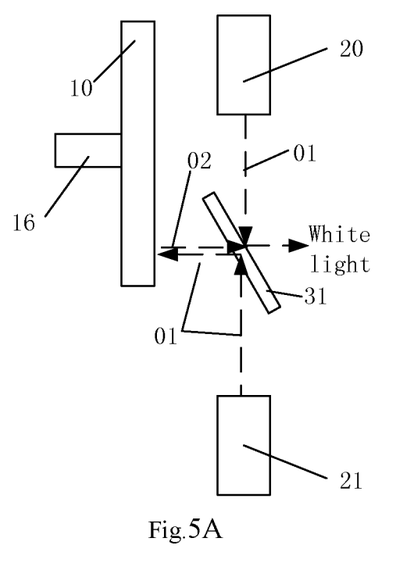
FIG. 5A is a structural schematic diagram of the projection light source according to the first embodiment of the present disclosure.
Figure 5B:
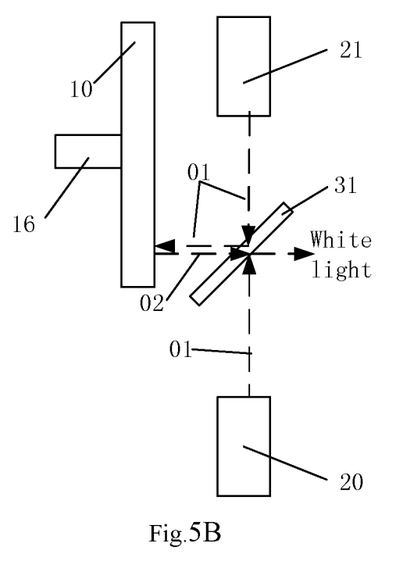
FIG. 5B is a structural schematic diagram of the projection light source according to the second embodiment of the present disclosure.

The projection light source according to an embodiment of the present disclosure, as shown in FIGS. 5A and 5B, includes the fluorescent wheel 10 mentioned above, a first sub-light source 20 and a second sub-light source 21 which are disposed opposite to each other and located towards to the reflecting surface of the fluorescent wheel 10, and a first dichroic mirror 31 which is disposed between the first sub-light source 20 and second sub-light source 21. The first color lights 01 emitted from both of the first sub-light source 20 and the second sub-light source 21 is projected to the first dichroic mirror 31, and the central axis of the first color light 01 emitted from the first sub-light source 20 coincides with that of the first color light 01 emitted from the second sub-light source 21. Wherein the first color light 01 emitted from the first sub-light source 20 is reflected by the first dichroic mirror 31 and projected away from the fluorescent wheel 10; the first color light 01 emitted from the second sub-light source 21 is reflected by the first dichroic mirror 31 and projected on the fluorescent layer 12 of the fluorescent wheel 10. The fluorescent layer 12 is excited by the first color light 01 to give out a second color light 02, which transmits through the first dichroic mirror 31. The axis of the second color light 02 through the first dichroic mirror 31 and the axis of the first color lights 01 reflected by the first dichroic mirror 31 have a common central axis, and give out a white light when mixed together.

Besides, the projection light source may further include a motor 16 which may drive the shaft 15 of the fluorescent wheel 10 to rotate.

It should be noted the following matters:

The first, the dichroic mirrors are characterized by almost completely through a certain wavelength of light, while the other wavelength of light almost completely reflected.

The second, based on the structure of the projection light source provided by the embodiment of the present disclosure, as shown in FIGS. 5A and 5B, if the first color light 01 emitted from the second sub-light source 21 is reflected towards the fluorescent wheel 10 by the first dichroic mirror 31, the second color light 02 excited out of the fluorescent layer 12 of the fluorescent wheel 10 by the first color light 01 is reflected towards the first dichroic mirror 31 along the same light path as the first color light 01, and the second color light 02 and the first color light 01 are certainly mixed together to give out white light. In FIGS. 5A and 5B, in order to facilitate the complete display of the light path, the central axis of the first color light 01 emitted from the second sub-light source 21 and reflected towards the fluorescent wheel 10 by the first dichroic mirror 31 and the central axis of the second color light 02 transmitted the fluorescent wheel 10 and reflected towards the first dichroic mirror 31 are drawn separately, however two central axes should be coincident actually, as is the case in following Figures.

Wherein, the first color light 01 and the second color light 02 are not limited, as long as white light may be mixed out.

The third, the f first sub-light source 20 and the second sub-light source 21 are not limited, as long as the first color light 01 may be emitted out.

The projection light source according to an embodiment of the present disclosure, by dividing the fluorescent layer 12 of the fluorescent wheel 10 into a high color gamut region 13 and a low color gamut region 14, the fluorescent wheel 10 may be excited and give out a light with high color gamut and low brightness, or a light with low color gamut and high brightness light. Thus, when the fluorescent wheel 10 is applied to a projector, one picture is displayed by two frames, in the first frame, the high gamut sub-pixels is turned on and the low gamut sub-pixels is turned off, in the second frame, the high gamut sub-pixels is turned off and the low-gamut sub-pixels is turned on, so that the picture watched by user contains both the high-color gamut portion and the low-color gamut portion, thereby the display effect is improved. In addition, when the first frame and the second frame are combined into one picture, the luminance may have a certain degree homogenization, so that the contradiction between the color gamut and the brightness may be improved.

Figure 6:
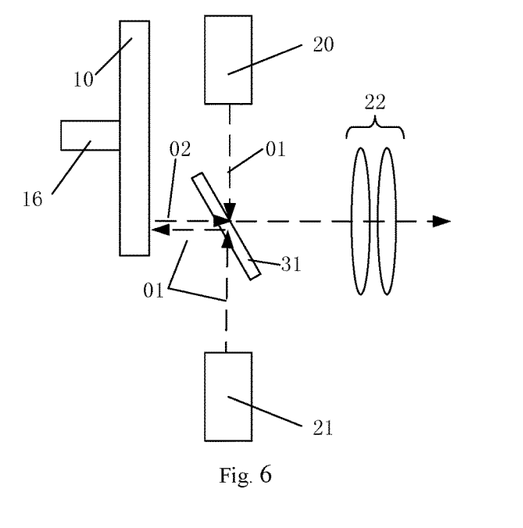
FIG. 6 is a structural schematic diagram of the projection light source according to the third embodiment of the present disclosure.

For example, as shown in FIG. 6, the projection light source further includes a group of optical elements 22 for shaping the beam of the white light, which are disposed at the side of the first dichroic mirror 31 far away from the fluorescent wheel. The optical axis of the optical element 22 coincides with the central axis of the white light.

In the embodiment of present disclosure, because the optical elements 22 disposed away from the first dichroic mirror 31 may adjust the white light, the white light emitted from the projection light source has more uniform light intensity.

Based on the above, for example, both of the first sub-light source 20 and the second sub-light source 21 are blue light source.

Wherein the blue light source may be LED (Light-Emitting Diode) or blue laser.

Besides, it will be appreciated by those skilled in the art that when the first sub-light source 20 and the second sub-light source 21 are blue light sources, the fluorescent layer 12 of the fluorescent wheel 10 emits yellow light with the excitation of blue light, and the yellow light is mixed with the blue light to give out a white light.

In the embodiment of present disclosure, both the first sub-light source 20 and the second sub-light source 21 are blue, the lifetime of the first sub-light source 20 and second sub-light source 21 may be prolonged. In addition, the blue light source process is also more mature.

Figure 7:
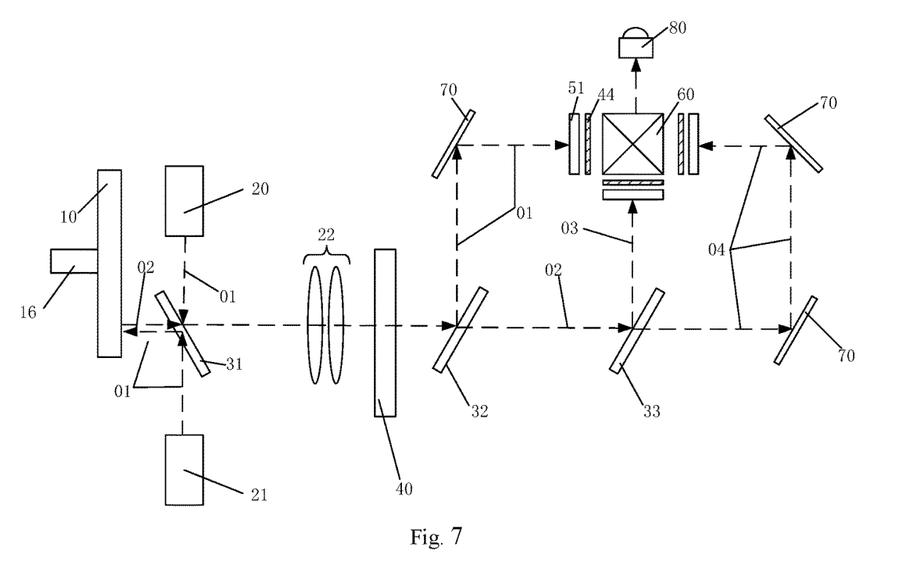
FIG. 7 is a structural schematic diagram of the projector according to the first embodiment of the present disclosure.
Figure 8:
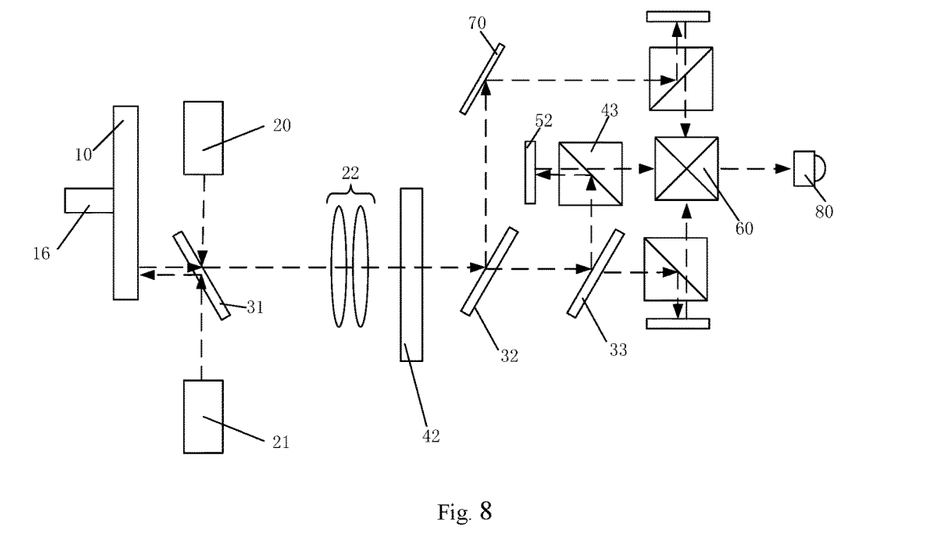
FIG. 8 is a structural schematic diagram of the projector according to the second embodiment of the present disclosure.
Figure 9:
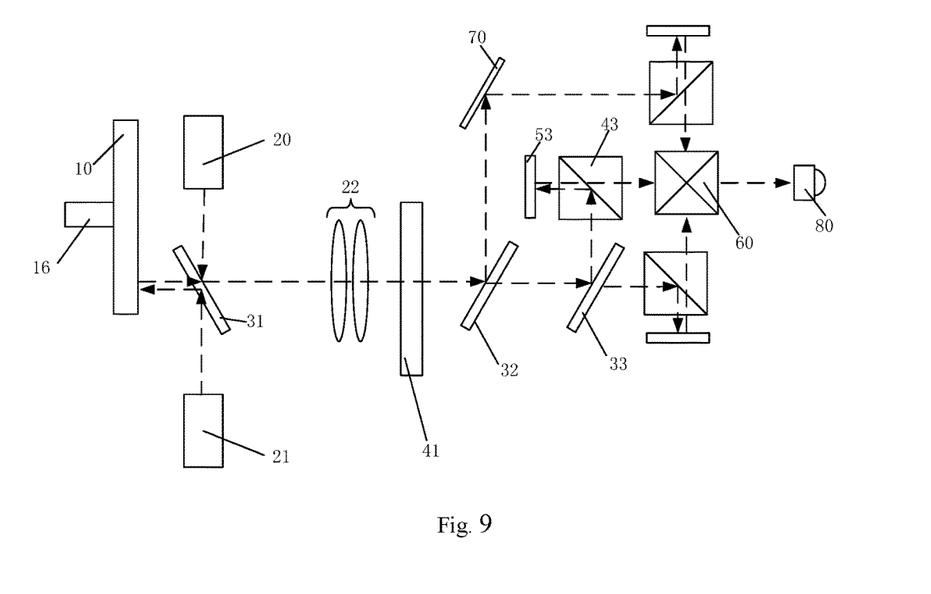
FIG. 9 is a structural schematic diagram of the projector according to the third embodiment of the present disclosure.

As shown in FIGS. 7 to 9, the projector according to an embodiment of the present disclosure includes the present projection light source.

A projector according to an embodiment of the present disclosure, by dividing the fluorescent layer 12 of the fluorescent wheel 10 into a high color gamut region 13 and a low color gamut region 14, the fluorescent wheel 10 may be excited and give out a light with high color gamut and low brightness, or a light with low color gamut and high brightness light. Thus, when the fluorescent wheel 10 is applied to a projector, one picture is displayed by two frames, in the first frame, the high gamut sub-pixels is turned on and the low gamut sub-pixels is turned off, in the second frame, the high gamut sub-pixels is turned off and the low-gamut sub-pixels is turned on, so that the picture watched by user contains both the high-color gamut portion and the low-color gamut portion, thereby the display effect is improved. In addition, when the first frame and the second frame are combined into one picture, the luminance may have a certain degree homogenization, so that the contradiction between the color gamut and the brightness may be improved.

The projector according to the present disclosure is described below in connection with specific embodiments.

The First Embodiment of the Projector

The projector, as shown in FIG. 7, includes the projection light source described above, and a first polarizing device 40, a second dichroic mirror 32, a third dichroic mirror 33 disposed on the light path of the projection light source in sequence.

Wherein the first color light 01 is reflected by the second dichroic mirror 32. The second color light 02 is transmitted through the second dichroic mirror 32, which is reflected by the third dichroic mirror 33 to form a third color light 03 and is transmitted through the third dichroic mirror 33 to form a fourth color light 04. That is to say, the second dichroic mirror 32 is used to reflect the first color light 01 and transmitted through the second color light 02; The third dichroic mirror 33 is used for reflecting the third color light 03, and transmitting the fourth color light 04. Wherein, the third color light 03 and the fourth color light 04 are mixed to give out the second color light 02.

The projector further includes multiple LCD chips 51 disposed on the light paths of the first color light 01, the third color light 03 and the fourth color light 04, a combining mirror 60 used to combine light beams emitted from the LCD chips 51, and second polarizing devices 44 disposed between the combining mirror 60 and each of the LCD chips 51, respectively. Wherein, the polarization direction of the first polarizing device 40 is perpendicular to the polarization direction of the second polarizing device 44. The first polarizing device 40 and second polarizing device 44 may be a polarized-light converter or a polarizing plate. The first polarizing device 40 and second polarizing device 44 in the first embodiment also apply to other embodiments of present disclosure.

The lights emitted from each LCD chip 51 are combined by the combination mirror 60, and the image is projected onto the display screen via the projection lens 80.

It should be noted the following matters:

The first, as shown in FIG. 7, the LCD chips 51 disposed on the light paths of the first color light 01, the third color light 03 and the fourth color light 04, and located at different position relative to the combining mirror 60, and the light path of the light transmitted through or reflected by the dichroic mirror is constant, therefore, those skilled in the art will appreciate that in order to make the lights emitted from the first color light 01, the third color light 03 and fourth color light 04 direct towards different positions of the combining mirror 60 so that the combining mirror 60 may combine the lights. It is necessary to dispose reflecting mirrors 70 in the light paths of the first color light 01, the third color light 03 and the fourth color light 04 at proper position so as to adjust the directions of the light paths. The reflecting mirror 70 also applies to other embodiments of present disclosure.

Wherein, the first color light 01, the third color light 03 and the fourth color light 04 are three primary colors.

The second, position of each member in the projector is not limited, FIG. 7 is illustration and example only, it is not limited.

In the embodiment, using LCD chip 51 as display element, the preparation process is mature, and production costs is low.

The Second Embodiment of the Projector

The projector, as shown in FIG. 8, includes a fluorescent wheel 10 which is excited out yellow light by blue light; a first sub-light source 20 and second sub-light source 21 used to emit blue light and disposed oppositely; a first dichroic mirror 31 disposed between the first sub-light source 20 and the second sub-light source 21 and used to transmit blue light and reflect yellow light; and a group of optical elements 22 for shaping the beam of the white light, which are disposed at the side of the first dichroic mirror 31 far away from the fluorescent wheel 10. Wherein, the first sub-light source 20, the second sub-light source 21 and the first dichroic mirror 31 are faced at the reflecting surface of the fluorescent wheel 10. The optical axis of the optical element 22 coincides with the central axis of the white light which is combined by the yellow light and the blue light.

The projector further includes a polarizing plate 42 disposed in the light path of white light, a second dichroic mirror 32 used for reflecting blue light and transmitting yellow light, a third dichroic mirror 33 used for reflecting green light and transmitting yellow light, LCOS (Liquid Crystal on Silicon) chips 52 disposed in the light path of the blue light, the green light and the red light, a combining mirror 60 used to combine lights emitted from the LCOS chips 52, and a polarizing beam combiners 43 disposed between the combining mirror 60 and each of the LCOS chips 52, respectively. Wherein, the polarization direction of the polarizing plate 42 is perpendicular to the polarization direction of the polarizing beam combiner 43.

Wherein, the lights emitted from each LCOS chips 52 are combined by the combination mirror 60, and the image is projected onto the display screen via the projection lens 80.

In the embodiment, using LCOS chip 52 as display element, resolution is higher, and displaying effect is better.

The Third Embodiment of the Projector

The projector, as shown in FIG. 9, includes a fluorescent wheel 10 which is excited out yellow light by blue light, a first sub-light source 20 and a second sub-light source 21 used to emit blue light and disposed oppositely, a first dichroic mirror 31 disposed between the first sub-light source 20 and the second sub-light source 21 and used for transmitting blue light and reflecting yellow light, and a group of optical elements 22 for shaping the beam of the white light, which are disposed at the side of the first dichroic mirror 31 far away from the fluorescent wheel. Wherein, the first sub-light source 20, the second sub-light source 21 and the first dichroic mirror 31 are faced at the reflecting surface of the fluorescent wheel 10. The optical axis of the optical element 22 coincides with the central axis of the beam of the white light which is combined by the yellow light and the blue light.

The projector further includes a polarized-light converter 41 disposed in the light path of white light, a second dichroic mirror 32 used for reflecting blue light and transmitting yellow light, a third dichroic mirror 33 used for reflecting green light and transmitting yellow light, DMD (Digital Micormirror Device) chips 53 disposed in the light paths of the blue light, the green light and the red light, a combining mirror 60 used to combine lights emitted from the LCOS chips 52, and a polarizing beam combiners 43 disposed between each LCOS chip 52 and the combining mirror 60. Wherein, the polarization direction of the polarized-light converter 41 is perpendicular to the polarization direction of the polarizing beam combiner 43.

Wherein, the lights emitted from each DMD chip 53 are combined by the combination mirror 60, and the image is projected onto the display screen via the projection lens 80.

In the embodiment, using DMD chip 53 as display element, the preparation process is mature, and resolution is higher. Besides, the polarized-light converter 41 converts all natural polarized light into linearly polarized light, improving the utilization of the light source.

Figure 10:
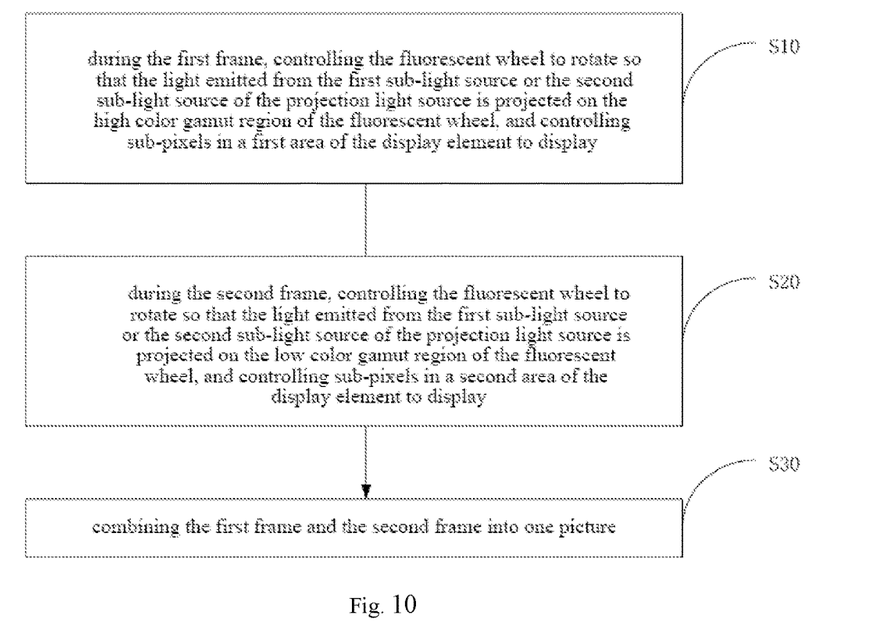
FIG. 10 is a flow diagram of the control method for the projector according to an embodiment of the present disclosure.
Figure 11:
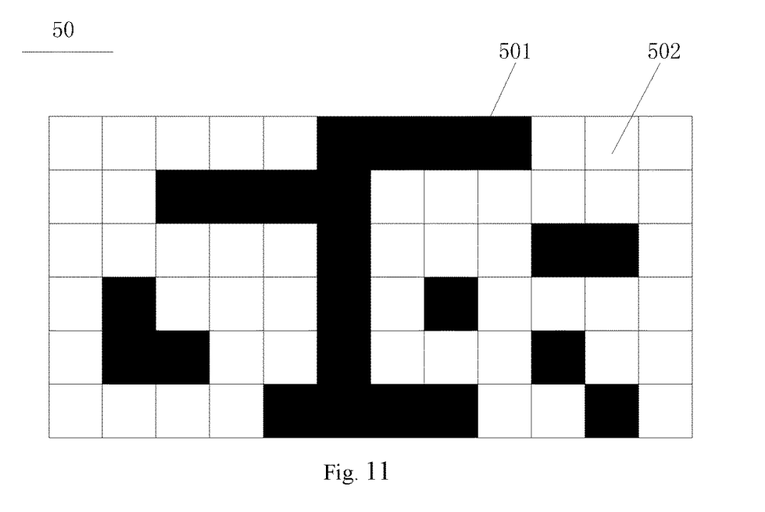
FIG. 11 is a pixel pattern of the display element of the projector according to an embodiment of the present disclosure.

The control method for a projector according present disclosure, as shown in FIG. 10, includes following steps:

S10, during the first frame, controlling the fluorescent wheel 10 to rotate so that the light emitted from the first sub-light source 20 or the second sub-light source 21 of the projection light source is projected on the high color gamut region 13 of the fluorescent wheel 10, and controlling sub-pixels in a first area 501 of the display element 50 (as shown in FIG. 11) to display;

S20, during the second frame, controlling the fluorescent wheel 10 to rotate so that the light emitted from the first sub-light source 20 or the second sub-light source 21 of the projection light source is projected on low color gamut region 14 of the fluorescent wheel 10, and controlling sub-pixels in a second area 502 of the display element 50 (as shown in FIG. 11) to display;

S30, combining the first frame and the second frame into one picture.

It should be noted the following matters:

The first, the sub-pixels in the first frame 501 and the sub-pixels in the second frame 502 constitute the sub-pixels of the display element 50.

Wherein, in the first frame, when the sub-pixels in the first frame 501 are displayed, the sub-pixels in the second frame 502 are tuned off; Correspondingly, in the second frame, the sub-pixels in the second frame 502 are displayed, the sub-pixels in the first frame 501 are turned off.

The second, combining the structure of the projection light source described above, those skilled in the art will appreciate that in the first frame, if the light emitted from the first sub-light source 20 is projected on the high color gamut region 13 of the fluorescent wheel 10, the light emitted from the first sub-light source 20 in the second frame is projected on the low color gamut region 14 of the fluorescent wheel 10. Similarly, in the first frame, if the light emitted from the second sub-light source 21 is projected on the high color gamut region 13 of the fluorescent wheel 10, the light emitted from the second sub-light source 21 in the second frame is projected on the low color gamut region 14 of the fluorescent wheel 10.

The third, there is no limit to the time sequence of the first frame and the second frame, a picture may be composed by a previous first frame and a posterior second frame, or by a previous second frame and a posterior first frame.

The control method for the projector according present disclosure, by dividing the fluorescent layer 12 of the fluorescent wheel 10 into a high color gamut region 13 and a low color gamut region 14, the fluorescent wheel 10 may be excited and give out a light with high color gamut and low brightness, or a light with low color gamut and high brightness light. Thus, when the fluorescent wheel 10 is applied to a projector, one picture is displayed by two frames, in the first frame, the high gamut sub-pixels is turned on and the low gamut sub-pixels is turned off, in the second frame, the high gamut sub-pixels is turned off and the low-gamut sub-pixels is turned on, so that the picture watched by user contains both the high-color gamut portion and the low-color gamut portion, thereby the display effect is improved. In addition, when the first frame and the second frame are combined into one picture, the luminance may have a certain degree homogenization, so that the contradiction between the color gamut and the brightness may be improved.

For example, the rotational speed of the fluorescent wheel 10 is greater than 50 revolutions per second.

The embodiment of present disclosure may control time interval between the first frame and the second frame by controlling the rotational speed of the fluorescent wheel 10, and avoid visible screen flaws to the naked eye due to long time interval, so that the display effect may not be affected.

It will be understood by those of ordinary skill in the art that: Implementing all or part of the steps of the control method embodiments described above may be accomplished by means of hardware associated with program instructions. The aforementioned program may be stored in a computer-readable storage medium, which may include various media, such as ROM, RAM, disk, or optical disk, which may store program code. When the program is executed, performing the steps including the control method embodiment described above.

The above described embodiments are only the specific embodiments of the present disclosure, but the scope of the present disclosure is not limited thereto. Within the technical scope disclosed in this disclosure, any variation or substitution easily anticipated by those skilled in the art are intended to be within the protection scope of the present disclosure. Accordingly, the protection scope of the present disclosure should be based on the protection scope of the claims.

What is claimed is:

1. A projection light source, comprising:
   a fluorescent wheel, comprising:
      a substrate having a reflecting surface; and
      a fluorescent layer disposed on the reflecting surface of the substrate; wherein the fluorescent layer comprises a high color gamut region and a low color gamut region;
   a first sub-light source and a second sub-light source disposed opposite to each other and located towards to the reflecting surface of the fluorescent wheel; and
   a first dichroic mirror disposed between the first sub-light source and the second sub-light source;
   wherein the first color lights emitted from both of the first sub-light source and the second sub-light source is projected on the first dichroic mirror, and the central axis of the first color light emitted from the first sub-light source coincides with that of the first color light emitted from the second sub-light source;
   wherein the first color light emitted from the first sub-light source is reflected by first dichroic mirror and projected away from the fluorescent wheel; the second color light emitted from the second sub-light source is reflected by the first dichroic mirror and projected on the fluorescent layer of the fluorescent wheel, the fluorescent layer is excited by the first color light to give out a second color light, which transmits through the first dichroic mirror; the axis of the second color light through the first dichroic mirror and the axis of the first color lights reflected by the first dichroic mirror have a common central axis, and give out a white light when mixed together.

2. The projection light source according to claim 1, further comprising:
   a group of optical elements for shaping the beam of the white light, which are disposed at a side of the first dichroic mirror far away from the fluorescent wheel, wherein the optical axis of the optical elements coincides with the central axis of the beam of the white light.

3. The projection light source according to claim 1, wherein both of the first sub-light source and the second sub-light source are of blue light.

4. A projector comprising the projection light source according to the claim 1.

5. The projector according to claim 4, further comprising:
   a first polarizing device, a second dichroic mirror, and a third dichroic mirror, which are all disposed on the light path of the projection light source; wherein the first color light is reflected by the second dichroic mirror, and the second color light is transmitted through the second dichroic mirror, the second color light transmitted through the second dichroic mirror is reflected and transmitted by the third dichroic mirror to form a third color light and a fourth color light, respectively;

display elements respectively disposed in light paths of the first color light, the third color light and the fourth color light; and a combining mirror for combining lights emitted from the display elements.

6. The projector according to claim 5, wherein the display element is an LCD chip; and the projector further comprises a second polarizing devices disposed between the combining mirror and each of the display elements, and the polarization direction of the first polarizing device is perpendicular to the polarization direction of the second polarizing device.

7. The projector according to claim 5, wherein the display element is an LCOS chip or a DMD chip; and the projector further comprises a polarizing beam combiner disposed between the combining mirror and each of the display elements; and the polarization direction of the first polarizing device is perpendicular to the polarization direction of the polarizing beam combiner.

8. The projector according to claim 5, wherein the first polarizing device is a polarized-light converter or a polarizing plate.

9. A projection light source, comprising:

a fluorescent wheel, comprising:

a substrate having a reflecting surface; and a fluorescent layer disposed on the reflecting surface of the substrate; wherein the fluorescent layer comprises a high color gamut region and a low color gamut region, the fluorescent layer is disposed near the edge of the substrate and presented in a circle;

a first sub-light source and a second sub-light source disposed opposite to each other and located towards to the reflecting surface of the fluorescent wheel; and a first dichroic mirror disposed between the first sub-light source and the second sub-light source;

wherein the first color lights emitted from both of the first sub-light source and the second sub-light source is projected on the first dichroic mirror, and the central axis of the first color light emitted from the first sub-light source coincides with that of the first color light emitted from the second sub-light source;

wherein the first color light emitted from the first sub-light source is reflected by first dichroic mirror and projected away from the fluorescent wheel; the second color light emitted from the second sub-light source is reflected by the first dichroic mirror and projected on the fluorescent layer of the fluorescent wheel, the fluorescent layer is excited by the first color light to give out a second color light, which transmits through the first dichroic mirror; the axis of the second color light through the first dichroic mirror and the axis of the first color lights reflected by the first dichroic mirror have a common central axis, and give out a white light when mixed together.

10. The projection light source according to claim 9, wherein both of the first sub-light source and the second sub-light source are of blue light.

11. A projector comprising the projection light source according to the claim 9.

12. The projector according to claim 11, wherein further comprising:

a first polarizing device, a second dichroic mirror, and a third dichroic mirror, which are all disposed on the light path of the projection light source; wherein the first color light is reflected by the second dichroic mirror, and the second color light is transmitted through the second dichroic mirror, the second color light transmitted through the second dichroic mirror is reflected and transmitted by the third dichroic mirror to form a third color light and a fourth color light, respectively;

display elements respectively disposed in light paths of the first color light, the third color light and the fourth color light; and a combining mirror for combining lights emitted from the display elements.

13. The projector according to claim 12, wherein the display element is an LCD chip; and the projector further comprises a second polarizing devices disposed between the combining mirror and each of the display elements, and the polarization direction of the first polarizing device is perpendicular to the polarization direction of the second polarizing device.

14. The projector according to claim 12, wherein the display element is an LCOS chip or a DMD chip; and the projector further comprises a polarizing beam combiner disposed between the combining mirror and each of the display elements; and the polarization direction of the first polarizing device is perpendicular to the polarization direction of the polarizing beam combiner.

15. A method for controlling a projector wherein the projector comprises a projection light source comprising:

a fluorescent wheel, having a substrate having a reflecting surface; and a fluorescent layer disposed on the reflecting surface of the substrate; wherein the fluorescent layer comprises a high color gamut region and a low color gamut region;

a first sub-light source and a second sub-light source disposed opposite to each other and located towards to the reflecting surface of the fluorescent wheel;

a first dichroic mirror disposed between the first sub-light source and the second sub-light source;

wherein the first color lights emitted from both of the first sub-light source and the second sub-light source is projected on the first dichroic mirror, and the central axis of the first color light emitted from the first sub-light source coincides with that of the first color light emitted from the second sub-light source;

wherein the first color light emitted from the first sub-light source is reflected by first dichroic mirror and projected away from the fluorescent wheel; the second color light emitted from the second sub-light source is reflected by the first dichroic mirror and projected on the fluorescent layer of the fluorescent wheel, the fluorescent layer is excited by the first color light to give out a second color light, which transmits through the first dichroic mirror; the axis of the second color light through the first dichroic mirror and the axis of the first color lights reflected by the first dichroic mirror have a common central axis, and give out a white light when mixed together;

wherein the projector further comprises: a first polarizing device, a second dichroic mirror, and a third dichroic mirror, which are all disposed on the light path of the projection light source; wherein the first color light is reflected by the second dichroic mirror, and the second color light is transmitted through the second dichroic mirror, the second color light transmitted through the second dichroic mirror is reflected and transmitted by the third dichroic mirror to form a third color light and a fourth color light, respectively;

display elements respectively disposed in light paths of the first color light, the third color light and the fourth color light; and a combining mirror for combining lights emitted from the display elements, the method comprising the following steps:

during the first frame, controlling the fluorescent wheel to rotate so that the light emitted from the first sub-light source or the second sub-light source of the projection light source is projected on the high color gamut region of the fluorescent wheel, and controlling sub-pixels in a first area of the display element to display;

during the second frame, controlling the fluorescent wheel to rotate so that the light emitted from the first sub-light source or the second sub-light source of the projection light source is projected on the low color gamut region of the fluorescent wheel, and controlling sub-pixels in a second area of the display element to display;

combining the first frame and the second frame into one picture.

16. The control method according to claim 15, wherein the rotational speed of the fluorescent wheel is greater than 50 revolutions per second.

* * * * *